United States Patent
Zahn

(10) Patent No.: US 12,536,902 B2
(45) Date of Patent: Jan. 27, 2026

(54) SYSTEM AND METHOD FOR COOPERATIVE MANEUVER PLANNING

(71) Applicant: Bayerische Motoren Werke Aktiengesellschaft, Munich (DE)

(72) Inventor: Peter Zahn, Herrsching A. Ammersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 302 days.

(21) Appl. No.: 17/419,351

(22) PCT Filed: Jan. 24, 2020

(86) PCT No.: PCT/EP2020/051748
§ 371 (c)(1),
(2) Date: Jun. 29, 2021

(87) PCT Pub. No.: WO2020/160934
PCT Pub. Date: Aug. 13, 2020

(65) Prior Publication Data
US 2022/0084402 A1 Mar. 17, 2022

(30) Foreign Application Priority Data
Feb. 6, 2019 (DE) ...................... 10 2019 102 990.2

(51) Int. Cl.
*G08G 1/09* (2006.01)
*B60W 60/00* (2020.01)

(52) U.S. Cl.
CPC ........... *G08G 1/091* (2013.01); *B60W 60/001* (2020.02); *B60W 2556/45* (2020.02)

(58) Field of Classification Search
CPC .. G08G 1/091; G08G 1/096791; G08G 1/163; G08G 1/166; B60W 60/001;
(Continued)

(56) References Cited

U.S. PATENT DOCUMENTS

| 11,017,665 B1 * | 5/2021 | Roy | G08G 1/14 |
| 2013/0099911 A1 * | 4/2013 | Mudalige | G08G 1/166 |

(Continued)

FOREIGN PATENT DOCUMENTS

| DE | 199 48 733 A1 | 4/2001 | |
| DE | 102012011994 A1 * | 12/2013 | B60W 30/09 |

(Continued)

OTHER PUBLICATIONS

Lombard, A. et al., "On the Cooperative Automatic Lane Change: Speed Synchronization and Automatic "Courtesy"", Design, Automation & Test in Europe Conference & Exhibition (Date), EDAA, Mar. 27, 2017, pp. 1655-1658, DOI: 10.23919/DAT.2017.7927259, XP033096625. (4 pages).

(Continued)

*Primary Examiner* — Ramon A. Mercado
*Assistant Examiner* — Ellis B. Ramirez
(74) *Attorney, Agent, or Firm* — Crowell & Moring LLP

(57) ABSTRACT

A system includes an ego determining device which is designed to determine at least one readiness for cooperation and/or at least one movement range for the ego vehicle; an ego communication unit which is coupled to the ego determining device and is designed to create an ego maneuver coordination message on the basis of the at least one determined readiness for cooperation and/or the at least one determined movement range; the ego communication unit having a vehicle interface which is designed to transmit the ego maneuver coordination message to at least one other road user and to receive a maneuver coordination message from at least one other road user; and an ego maneuver-planning unit which is coupled to the ego determining device and the ego communication unit and is designed to plan a driving maneuver of the ego vehicle taking into account a received maneuver coordination message.

10 Claims, 2 Drawing Sheets

(58) Field of Classification Search
CPC .... B60W 2556/45; B60W 30/00; H04W 4/08; H04W 4/80; H04W 4/46; H04L 67/125; G05D 1/0289; G05D 1/0212; G05D 2201/0213
USPC .............................................. 701/25, 48, 301
See application file for complete search history.

(56) References Cited

U.S. PATENT DOCUMENTS

| | | | |
|---|---|---|---|
| 2013/0325306 A1* | 12/2013 | Caveney | B60W 30/0953 |
| 2015/0100225 A1* | 4/2015 | Fuehrer | G08G 1/096725 |
| 2015/0134150 A1* | 5/2015 | Farjon | G08G 5/55 701/3 |
| 2017/0053530 A1* | 2/2017 | Gogic | H04W 4/46 |
| 2018/0227729 A1* | 8/2018 | Bai | G01C 21/3453 |
| 2018/0319403 A1* | 11/2018 | Buburuzan | G06V 20/56 |
| 2018/0321689 A1* | 11/2018 | Lehmann | G08G 1/163 |
| 2019/0098471 A1* | 3/2019 | Rech | G08G 1/22 |
| 2019/0164424 A1* | 5/2019 | Kleen | G08G 1/096741 |
| 2019/0243381 A1* | 8/2019 | Strunck | G08G 1/096791 |
| 2020/0042013 A1* | 2/2020 | Kelkar | H04W 4/46 |
| 2021/0031800 A1 | 2/2021 | Fuchs et al. | |
| 2021/0394792 A1* | 12/2021 | Ahmad | H04W 4/46 |
| 2022/0061093 A1* | 2/2022 | Back | H04W 74/0816 |

FOREIGN PATENT DOCUMENTS

| | | |
|---|---|---|
| DE | 10 2016 205 140 A1 | 5/2017 |
| DE | 10 2016 205 142 A1 | 10/2017 |
| DE | 10 2018 109 885 A1 | 12/2018 |

OTHER PUBLICATIONS

International Search Report (PCT/ISA/210) issued in PCT Application No. PCT/EP2020/051748 dated Mar. 19, 2020 with English translation (seven (7) pages).

German-language Written Opinion (PCT/ISA/237) issued in PCT Application No. PCT/EP2020/051748 dated Mar. 19, 2020 (12 pages).

German-language Search Report issued in German Application No. 10 2019 102 990.2 dated Oct. 24, 2019 with partial English translation (14 pages).

Chinese-language Office Action issued in Chinese Application No. 202080012398.4 dated Jun. 14, 2023 with English translation (13 pages).

\* cited by examiner

SYSTEM AND METHOD FOR COOPERATIVE MANEUVER PLANNING

BACKGROUND AND SUMMARY OF THE INVENTION

The invention relates to a system for an ego vehicle for cooperative maneuver planning with at least one other road user and to a method for cooperative maneuver planning for an ego vehicle with at least one other vehicle.

The prior art has disclosed various assistance systems which assist drivers and/or vehicles in road traffic. As a result, on the one hand, the drivers of the vehicles can be relieved and, on the other hand, the road traffic becomes safer because driving tasks are carried out in an automated fashion by the vehicles without the intervention of humans.

Nevertheless, it is clear that human drivers have capabilities which systems available up till now do not perform, or only perform insufficiently. Capabilities which relate to the communication and cooperation between road users can, for example, not yet be fully performed in an automated fashion by assistance systems. For example, the way in which a human driver drives their vehicle (for example the opening up and closing of gaps) can assist or hinder driving maneuvers of other road users, which in turn influences their driving behavior.

It is therefore desirable to bring about cooperative communication between vehicles which are interconnected to one another, in order to communicate their driving maneuvers to one another and coordinate them with one another. In order to implement this, a rapid exchange of information is necessary both between the individual vehicles and between the vehicles and the infrastructure. However, it is problematic to provide a communication mechanism which operates between different manufacturers and which ensures frictionless exchange of this data. Specific methods which are available require an associated agreed set of messages. Any subscriber must comply with method-specific rules for the transmission of the messages. The agreement to use one most suitable method and therefore to adopt one associated agreed set of messages is extremely difficult.

The invention is based on the object of making available a system and a method for cooperative maneuver planning which overcomes at least partially the disadvantages in the prior art.

The object is achieved by the claimed invention.

A first aspect of the invention relates to a system for an ego vehicle for cooperative maneuver planning with at least one other road user, wherein the system has:
 an ego determining device which is designed to determine at least one readiness for cooperation and/or at least one movement range for the ego vehicle;
 an ego communication unit which is coupled to the ego determining device and is designed to produce an ego maneuver coordination message on the basis of the at least one determined readiness for cooperation and/or the at least one determined movement range;
 wherein the ego communication unit has a vehicle interface which is designed to transmit the ego maneuver coordination message to at least one other road user and which is designed to receive a maneuver coordination message from at least one other road user;
 wherein the ego maneuver coordination message and the maneuver coordination message comprise at least one of the following message components: message receiver; cooperation readiness information; movement range information; and wherein the vehicle interface is configured in such a way that it can both transmit and receive any message components;
 an ego maneuver planning unit which is coupled to the ego determining device and the ego communication unit and is designed to plan a driving maneuver of the ego vehicle taking into account a received maneuver coordination message.

A second aspect of the invention relates to a method for cooperative maneuver planning for an ego vehicle with at least one other road user, wherein the method comprises:
 determining at least one readiness for cooperation and/or at least one movement range for the ego vehicle;
 producing an ego maneuver coordination message on the basis of the at least one determined readiness for cooperation and/or the at least one determined movement range;
 transmitting the ego maneuver coordination message via a vehicle interface to at least one other road user and/or receiving a maneuver coordination message from at least one other road user; wherein the ego maneuver coordination message and the maneuver coordination message comprise at least one of the following message components: message receiver; cooperation readiness information; movement range information; and
 wherein the vehicle interface is configured in such a way that it can both transmit and receive any message components;
 planning a driving maneuver of the ego vehicle taking into account a received maneuver coordination message.

A road user according to the present document is to be understood as being a unit which participates in the traffic system. Such a unit can be a vehicle, in particular a driver-controlled vehicle or an automated vehicle. Alternatively, such a unit can be a cyclist, a pedestrian, an animal, a machine or the like.

The road user is advantageously a vehicle which is different from the ego vehicle.

A vehicle according to the present document is to be understood as being any type of vehicle with which persons and/or goods can be transported. Possible examples of this are: a motor vehicle, a truck, land vehicles, buses, driver cabs, cable cars, elevator cars, rail vehicles, watercraft (e.g. ships, boats, submarines, diving bells, hovercraft, hydrofoils), aircraft (airplanes, helicopters, ground effect vehicles, airships, balloons).

The vehicle is preferably a motor vehicle. A motor vehicle in this sense is a land vehicle which is moved by machine force without being bound to tracks. A motor vehicle in this sense comprises a car, a motorbike and a tractor unit.

The system described here for cooperative maneuver planning is described for a vehicle, but is not necessarily part of the vehicle. The system for cooperative maneuver planning or parts of the system can accordingly be arranged outside a vehicle. That is to say that there can also be an embodiment of the system for cooperative maneuver planning in which part or parts of the system is/are arranged inside a vehicle and/or parts of the system are arranged outside a vehicle.

The ego vehicle described herein or the other road user described herein is preferably a vehicle which is equipped with a system and/or vehicle functions which permit(s) an automated driving mode. The term "automated driving mode" is used to mean a partially automated driving mode, highly automated driving mode or fully automated or autonomous driving mode. In this context, the automated driving modes correspond to the degrees of automation defined by the Bundesanstalt für Straßenwesen (BASt) [German Federal Highway Research Agency], (see BASt publication "Forschung kompakt [research compact]", issue November 2012). During partially automated driving (TAF), the system performs the longitudinal and lateral guidance for a certain period of time and/or in specific situations, wherein the driver must continuously monitor the system. In the case of highly automated driving (HAF), the system performs the longitudinal and lateral guidance for a certain period of time without the driver having to continuously monitor the system; the driver must, however, be able to perform the guidance of the vehicle in a certain time. In the case of fully automated (autonomous) driving (VAF), the system can control the driving automatically in all situations for a specific application; for this application there is no longer a need for a driver. The degrees of automation specified above according to the definition of the BASt correspond to the SAE levels 2 to 4 of the Standard SAE J3016 (SAE— Society of Automotive Engineering). For example, highly automated driving (HAF) according to the BASt corresponds to level 3 of the Standard SAE J3016. In addition, in SAE J3016, SAE level 5 is also provided as a maximum degree of automation, which is not included in the BASt definition. SAE level 5 corresponds to driverless driving during which the system can automatically control all situations during the entire journey like a human driver; a driver is generally no longer necessary. In the present document, the "fully automated" degree of automation is intended to include the case of driverless driving.

In other words, the road user described herein or the ego vehicle described herein can be a manually controlled vehicle, i.e. one which is in a manual driving mode, or a vehicle which is controlled in an automated fashion, i.e. is in an automated driving mode.

It is irrelevant for the coordination of driving maneuvers and the corresponding movements of the road users or vehicles whether the vehicle guidance is being carried out in an automated fashion or with a relatively high or low degree of human participation (manual or partially automated driving). A driver can assume control at any time—with or without a corresponding request. This can result in a sudden change of intention of the road user (e.g. of a driver and/or of a vehicle).

The ego maneuver coordination message is used to communicate the current, possibly also suddenly changed, intention of the ego vehicle to the other road users, e.g. other vehicles in the surroundings of the ego vehicle.

There is no need for a transmitter-end controller for ensuring chronological consistency for the interoperability. Transmitted maneuver coordination message can optionally comply with additional consistency conditions at their own discretion (e.g. the selection of a specialized coordination method). However, the STVO [German Road Traffic Act] alone continues to be the measure for the legal assessment of the communication and interaction of the road users or vehicles.

The coupling, e.g. the coupling of the ego determining device or of the ego communication unit to the ego maneuver planning unit, is used to mean a communicative connection within the scope of the present document. The communicative connection can be wireless (e.g. Bluetooth, WLAN, mobile radio) or wired (e.g. by way of a USB interface, a data cable etc.).

The system or method described here for cooperative maneuver planning makes possible a general, generic and adaptive communication method for coordinating cooperative vehicle maneuvers. It makes it possible to use different controllers and decision bases for coordinating maneuver cooperation, and to use different methods for maneuver coordination with road users or vehicles. Through the transmission and reception of maneuver coordination messages, it is possible to achieve a common understanding independently of the method, in order to achieve cooperation between the road users or vehicles despite the fact that different methods are being used.

The ego vehicle determines at least one readiness for cooperation. In other words, the ego vehicle signals readiness for cooperation or a lack of readiness for cooperation to the outside, i.e. to other vehicles. The determination of this readiness for cooperation is carried out according to the specific method which the respective road user or the respective vehicle (ego vehicle or another vehicle) uses. The ego maneuver coordination message, which contains, for example, cooperation readiness information, can, however, be understood and interpreted by any participating road user. The maneuver planning or the implementation of coordination is assisted only by information which is made available, without a method for maneuver planning or maneuver coordination being defined or preferred. Suitable exchange of maneuver coordination messages between road users and/or vehicles makes it possible for different methods for maneuver coordination to coexist and permits interoperability between these different methods.

The maneuver coordination messages which are transmitted by the ego vehicle or by the other road users, in particular the other vehicles, are defined in such a way that information which is obtained about the situation of the transmitting road user or vehicle supports different methods for maneuver planning or maneuver coordination in receiving road users or vehicles. Each road user, in particular each vehicle or the ego vehicle, makes the decision about the maneuver planning or maneuver coordination autonomously. The current result or intermediate result of cooperative coordination is communicated to the other road users independently of the methods, for example via a simple group assignment.

The ego maneuver coordination message of the ego vehicle or the maneuver coordination message of another road user can have different optional message components. The decision as to which message components are included is made by the transmitter. In other words, the respective transmitter decides which components are used to fill the maneuver coordination messages.

Certain obligatory message components can preferably be prescribed for the ego maneuver coordination message or the maneuver coordination message. Such obligatory message components can be, for example, a time stamp or standardized message components.

According to one embodiment, which can be combined with one or more of the embodiments described herein, the vehicle interface is also designed to transmit the ego maneuver coordination message on an event-driven basis or cyclically with a repetition rate which can be determined as desired.

An event-driven ego maneuver coordination message can be repeated as often as desired depending on the occurrence of an event. An event-driven ego maneuver coordination message can also be, for example, a repetition or an update for improving the transmission reliability.

The vehicle interface can advantageously both transmit and receive any message components. That is to say the vehicle interface is able to receive and process maneuver coordination message independently of a specific method for maneuver coordination which is used by a road user.

The ego maneuver coordination message can be filled with information which identifies certain numbers of other road users, in particular of other vehicles, in accordance with their role for a possible or aimed-for cooperative operation or non-cooperative operation from the point of view of the transmitting ego vehicle.

According to one embodiment, which can be combined with one or more of the embodiments described herein, the message receiver is a single identifiable road user and/or a number of road users which can be identified on the basis of certain properties.

A pseudonym ID composed of V2V protocols (vehicle protocols), for example, can serve to identify a single road user, in particular a single vehicle. In order to identify a pedestrian, it is possible to use, for example, an identification number of a mobile terminal which the pedestrian has on their person.

Certain properties, which can be used to identify a number of road users, comprise, for example, spatial areas. Examples of such a spatial area are ETSI Geocasts or own-position and/or roadway-related identifications such as e.g. longitudinal distances or lateral coordinates including lane assignments. For example, in a situation when a vehicle is approaching an acceleration lane, the number of all vehicles located behind the ego vehicle on the right-hand lane of the main roadway can be identified with certain properties (e.g. within a distance range).

Filling the maneuver coordination messages with information which is assigned to the other road users by the ego vehicle makes it possible to classify the other road users. This classification is expressed in the cooperation readiness information.

According to one embodiment, which can be combined with one or more of the embodiments described herein, the cooperation readiness information comprises at least one of the following:
- a requirement information item which indicates the requirement for cooperation;
- an approval information item which indicates the approval of cooperation;
- an offer information item which indicates the offer of cooperation;
- a rejection information item which indicates the refusal of cooperation.

A requirement information item describes the request of a road user, in particular of a vehicle, for cooperation with another road user.

The approval information describes the approval of the cooperation with another road user.

The offer information describes the offer of a road user, in particular of a vehicle, to cooperate with another road user. In this context, there is no approval of the cooperation with another road user. If cooperation is offered to a road user, for example by the ego vehicle, but the cooperation is not yet approved, the ego maneuver coordination message or the cooperation readiness information of the ego maneuver coordination message contains an offer information item. Whether such an offer is made is at the discretion of the ego vehicle.

Such offer information is useful if a requirement of a road user is not yet present, but its need for cooperation is detected. If a requirement of the road user is subsequently received, this road user can immediately be assigned to the group of road users which approve cooperation.

The rejection information describes the situation in which a road user, in particular a vehicle (for example the ego vehicle), does not offer and/or does not approve cooperation.

An example of this would be the road user, in particular the vehicle, insisting on having priority.

The cooperation readiness information can be used to assign road users to a specific group, for example the group of "approval-willing road users" or the group of "offering road users".

The ego maneuver coordination message and/or the maneuver coordination message always advantageously comprise/comprises at least one cooperation readiness information item.

The group assignment of surrounding road users which is described with this ensures the possibility of cooperation with other road users which can transmit maneuver coordination messages.

An interoperable maneuver coordination operation is made possible through the communication of this group membership of the other road users, which is assigned from the perspective of the ego vehicle.

An exemplary control sequence of such a maneuver coordination operation can take the following form:

A road user A on the approach lane to a highway enters road users whose cooperation it desires into the group of "road users with a requirement".

A road user B on the highway enters the road user driving up to it into the group of "approval-willing road users". Said road user B will then make it possible for it to feed into the traffic through sufficient maintenance of distances and/or by changing lane.

If A has reached the target lane, A will remove the road user B from the group of "road users with a requirement", and B will remove the road user A from the group of "approval-willing road users".

The unrequested offering of cooperation, acceptance or refusal of cooperation can be communicated by the ego vehicle by way of a corresponding assignment of the road users to the groups. The way in which vehicles will react to this assignment can be left to be determined by the customary behavior of traffic. Behavior which is contrary to the regulations is communicated and in this way potentially documented or becomes transparent as an inconsistency between earlier communication and the actual behavior.

According to one embodiment, which can be combined with one or more of the embodiments described herein, the movement range information comprises at least one of the following:
- a reference range information item which indicates a planned movement range;
- a requirement range information item which indicates the requirement for a movement range;
- an approval range information item which indicates the approval of a movement range.

A movement range can be described by way of so-called paths (loci) or trajectories (paths with additional time information). A movement range can also be described in a planar fashion by way of at least one path and/or at least one trajectory. For example, two trajectories can represent the left-hand and right-hand edges of the movement range.

A reference range information item describes a planned movement range (reference movement range). In other words, a reference range information item describes the currently provided movement range of a road user. A cooperation situation is preferably already present for the planned movement range.

A requirement range information item describes the requirement for a movement range. A requirement range information item describes the movement range which is aimed at by a road user, wherein a corresponding cooperation operation of another road user is a prerequisite.

An approval range information item describes the approval of a movement range. In other words, an approval range information item describes an offered movement range of a road user which supports the cooperation with another road user.

According to a further embodiment, a requirement range information item and/or an approval range information item is/are assigned a qualification measure. The qualification measure specifies the degree of advantageousness or disadvantageousness of the requirement range information and/or of the approval range information in relation to the reference range information. In other words, the qualification measure is used to assess how advantageous or disadvantageous a specific range is in comparison with the reference range.

In other words, the qualification measure specifies a measure which specifies the relative advantage for a requirement for a movement range in comparison with the planned movement range (reference movement range). Furthermore, the qualification measure can specify a measure which specifies the relative disadvantage of an approval of a movement range in comparison with the planned movement range (reference movement range).

For example, the qualification measure values can lie in the range of −1 (to be rejected to the maximum degree, e.g. full braking or danger of an accident) or 1 (to be preferred to the maximum degree, e.g. driving at the desired travel speed without disadvantages in terms of safety, comfort, travel time).

According to one embodiment, which can be combined with one or more of the embodiments described herein, the transmission of the ego maneuver coordination message and the reception of the maneuver coordination message are independent of a specific method for the coordination of maneuvers.

According to one embodiment, which can be combined with one or more of the embodiments described herein, the ego vehicle uses a first method for coordinating maneuvers, and the at least one other road user uses a second method for coordinating maneuvers, which is different from the first, wherein the vehicle interface is compatible both with the first method for coordinating maneuvers and with the second method.

The maneuver coordination between road users by transmitting at different times (ego) maneuver coordination messages which are filled in different ways can be carried out at the discretion of the respective road user without the interoperability between the road users being adversely affected by this variability. The interpretation of received (ego) maneuver coordination messages is also carried out at the discretion of the respective road user.

On the basis of the proposed exchange of (ego) maneuver coordination messages, different methods can be implemented for arriving at decisions with respect to cooperation.

After the decision with respect to cooperation has been arrived at by the road user, for example by the ego vehicle, the result or intermediate result of the cooperative coordination operation is communicated to the surrounding road users independently of the method by way of a simple group assignment.

According to a further embodiment, a vehicle having a system, as described above, for cooperative maneuver planning for a vehicle is made available. In other words, the system for cooperative maneuver planning for a vehicle is a component of the vehicle.

The above statements relating to the inventive system for an ego vehicle for cooperative maneuver planning with at least one other road user according to the first aspect of the invention also apply in a corresponding way to the method for cooperative maneuver planning for an ego vehicle with at least one other road user according to the second aspect of the invention, and vice versa; advantageous exemplary embodiments of the method according to the invention correspond to the described advantageous exemplary embodiments of the system according to the invention. Advantageous exemplary embodiments of the method according to the invention which have not been explicitly described at this point correspond to the described advantageous exemplary embodiments of the system according to the invention.

Further advantages, features and details of the invention emerge from the following description of a preferred exemplary embodiment and with reference to the drawing. The features and feature combinations which are mentioned above in the description and the features and feature combinations which are mentioned below in the description of the figures and/or shown solely in the figures can be used not only in the respectively specified combination but also in other combinations or alone without departing from the scope of the invention.

The invention will be described below on the basis of exemplary embodiments and with the aid of the appended drawings.

DETAILED DESCRIPTION OF THE DRAWINGS

Figure 1:
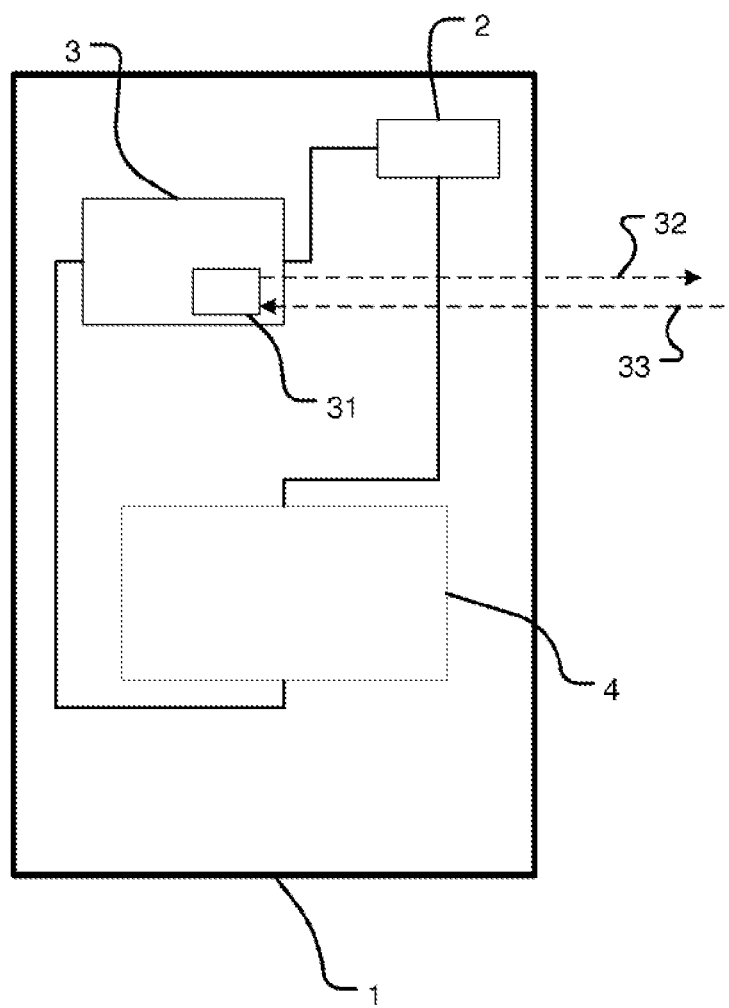
FIG. 1 shows schematically a system for cooperative maneuver planning for an ego vehicle according to one embodiment.

FIG. 1 shows a schematic illustration of a system 1 for an ego vehicle for cooperative maneuver planning with at least one other road user. The system has an ego determining device 2. The ego determining device 2 determines at least one readiness for cooperation and/or at least one movement range for the ego vehicle.

The ego determining device 2 is coupled to an ego communication unit 3. The ego communication unit 3 produces an ego maneuver coordination message 32 on the basis of the at least one determined readiness for cooperation and/or the at least one determined movement range.

The ego communication unit 3 has a vehicle interface 31. The vehicle interface 31 can transmit the ego maneuver coordination message 32 to at least one other road user and receive a maneuver coordination message 33 from at least one other road user. The ego maneuver coordination message 32 and the maneuver coordination message 33 comprise at least one of the following message components: message receiver; cooperation readiness information; and movement range information. The vehicle interface 31 is configured in such a way that it can both transmit and receive any message components.

An ego maneuver planning unit 4 is coupled to the ego determining device 2 and the ego communication unit 3. The ego maneuver planning unit 4 plans a driving maneuver of the ego vehicle taking into account one or more received maneuver coordination messages.

Figure 2:
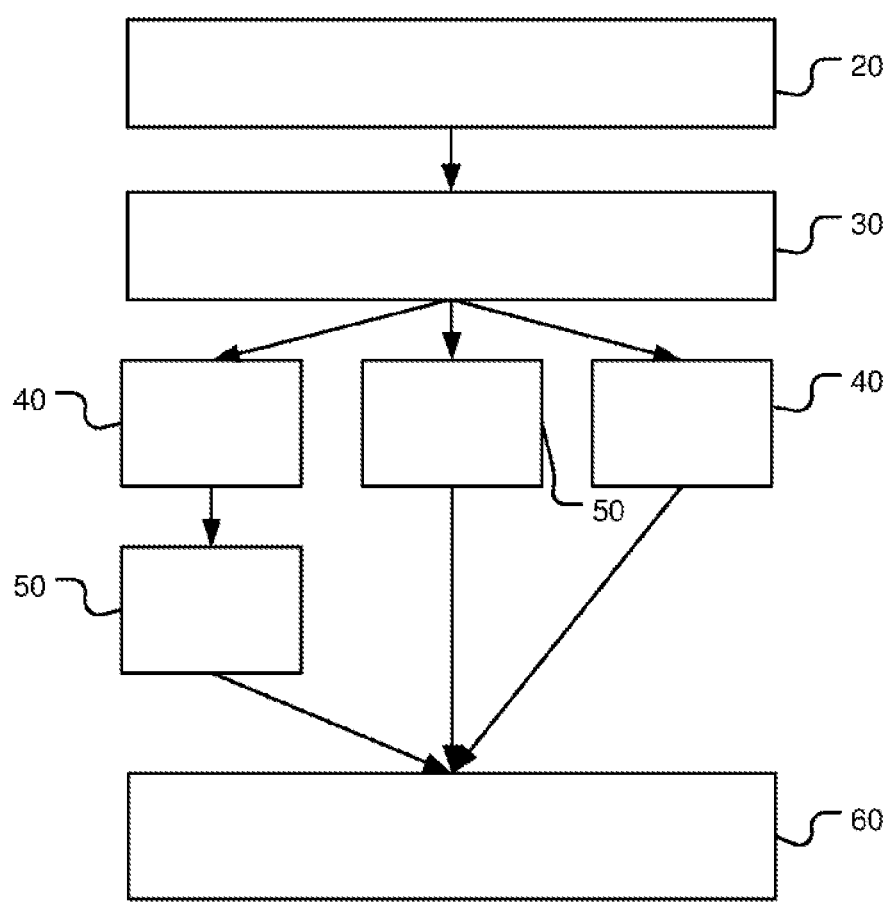
FIG. 2 shows schematically a method for cooperative maneuver planning for an ego vehicle according to one embodiment.

FIG. 2 shows schematically a method for cooperative maneuver planning for an ego vehicle with at least one other road user. The method comprises determining 20 at least one readiness for cooperation and/or at least one movement range for the ego vehicle; producing 30 an ego maneuver coordination message 32 on the basis of the at least one determined readiness for cooperation and/or the at least one determined movement range; transmitting 40 the ego maneuver coordination message 32 to at least one other road user and/or receiving 50 a maneuver coordination message 33 from at least one other road user, wherein the transmission 40 and the reception 50 are carried out via a vehicle interface 31.

The ego maneuver coordination message 32 and the maneuver coordination message 33 comprise at least one of the following message components: message receiver; cooperation readiness information; movement range information.

The vehicle interface 31 is configured in such a way that it can both transmit and receive any message components.

Furthermore, the method comprises planning 60 a driving maneuver of the ego vehicle taking into account a received maneuver coordination message 33.

What is claimed is:

1. A system for an ego vehicle for cooperative maneuver planning with at least one other road user, the system comprising:
    an ego determining device which is configured to determine at least one of at least one readiness for cooperation or at least one movement range for the ego vehicle;
    an ego communication unit which is coupled to the ego determining device and is configured to produce an ego maneuver coordination message on the basis of the at least one of the at least one determined readiness for cooperation or the at least one determined movement range; wherein:
        the ego communication unit comprises a vehicle interface which is configured to transmit the ego maneuver coordination message to at least one other road user and which is configured to receive a maneuver coordination message from at least one other road user;
        the ego maneuver coordination message and the maneuver coordination message comprise at least one of the following message components:
        a message receiver;
        cooperation readiness information; or
        movement range information; and
        the vehicle interface is configured such that the vehicle interface can both transmit and receive any of the message components; and
    an ego maneuver planning unit which is coupled to the ego determining device and the ego communication unit and is configured to plan a driving maneuver of the ego vehicle taking into account one or more received maneuver coordination messages,
    wherein the system is configured to assign the at least one other road user to a group of road users based on the cooperation readiness information of the at least one other road user,
    wherein the group of road users is selected from a list of classifications that includes approval-willing road users and offering road users, and
    wherein each of the offering road users transmits a maneuver coordination message comprising an offer to cooperate with the ego vehicle.

2. The system as claimed in claim 1,
    wherein the vehicle interface is further configured to transmit the ego maneuver coordination message on an event-driven basis or cyclically with a repetition rate.

3. The system as claimed in claim 1,
    wherein the message receiver is a single identifiable road user or a plurality of road users which can be identified on the basis of certain properties.

4. The system as claimed in claim 1,
    wherein the cooperation readiness information comprises at least one of the following:
        a requirement information item which indicates a requirement for cooperation;
        an approval information item which indicates an approval of cooperation;
        an offer information item which indicates an offer of cooperation; or
        a rejection information item which indicates a refusal of cooperation.

5. The system as claimed in claim 1,
    wherein the movement range information comprises at least one of the following:
        a reference range information item which indicates a planned movement range;
        a requirement range information item which indicates a requirement for a movement range; or
        an approval range information item which indicates an approval of a movement range.

6. The system as claimed in claim 5,
    wherein at least one of a requirement range information item or an approval range information item is assigned a qualification measure which specifies a degree of advantageousness or disadvantageousness of at least one of the requirement range information or of the approval range information in relation to reference range information.

7. The system as claimed in claim 1,
    wherein transmission of the ego maneuver coordination message and the reception of the maneuver coordination message are independent of a specific method for the coordination of maneuvers.

8. The system as claimed in claim 1, wherein:
    the ego vehicle uses a first method for coordinating maneuvers, and the at least one other road user uses a second method for coordinating maneuvers,
    the first method is different from the second method, and
    the vehicle interface is compatible with the first method and with the second method.

9. A vehicle comprising a system as claimed in claim 1.

10. A method for cooperative maneuver planning for an ego vehicle with at least one other road user, the method comprising:
    determining at least one of at least one readiness for cooperation or at least one movement range for the ego vehicle;
    producing an ego maneuver coordination message on the basis of the at least one of the at least one determined readiness for cooperation or the at least one determined movement range;
    at least one of transmitting the ego maneuver coordination message via a vehicle interface to at least one other road user or receiving a maneuver coordination message from the at least one other road user; wherein the ego maneuver coordination message and the maneuver coordination message comprise at least one of the following message components:

a message receiver;
cooperation readiness information; or
movement range information; and
   wherein the vehicle interface is configured such that the vehicle interface can both transmit and receive any of the message components;
assigning the at least one other road user to a group of road users based on the cooperation readiness information of the at least one other road user; and
planning a driving maneuver of the ego vehicle taking into account a received maneuver coordination message,
wherein the group of road users is selected from a list of classifications that includes approval-willing road users and offering road users, and
wherein each of the offering road users transmits a maneuver coordination message comprising an offer to cooperate with the ego vehicle.

\* \* \* \* \*